Oct. 23, 1956 A. LUNDBYE 2,768,133
PLASTIC ARTICLES AND METHOD OF MAKING SAME
Filed Aug. 4, 1951 2 Sheets-Sheet 1
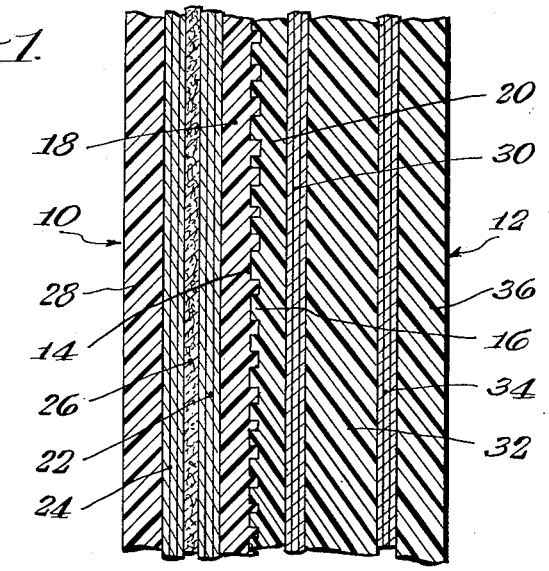
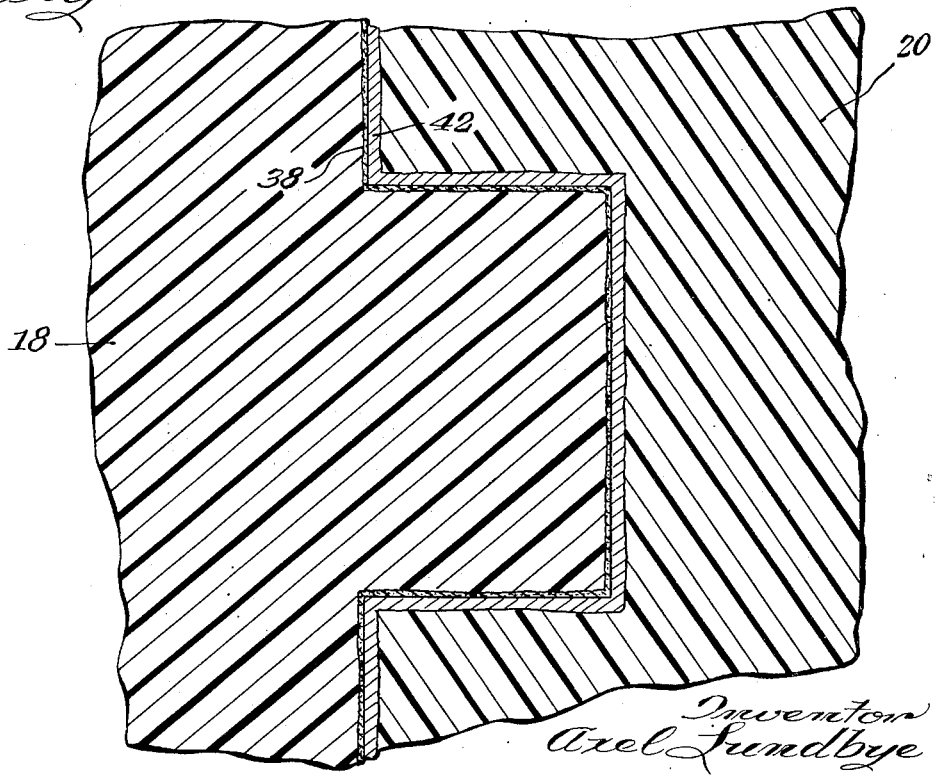
Inventor
Axel Lundbye
By Mann, Brown & Hausmann
Attorneys Oct. 23, 1956  A. LUNDBYE  2,768,133
PLASTIC ARTICLES AND METHOD OF MAKING SAME
Filed Aug. 4, 1951  2 Sheets-Sheet 2
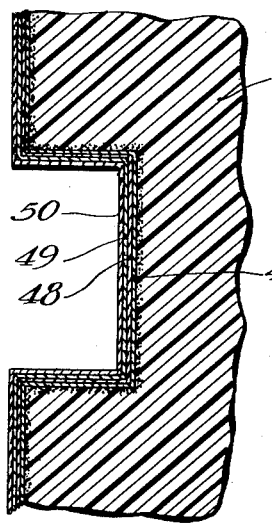
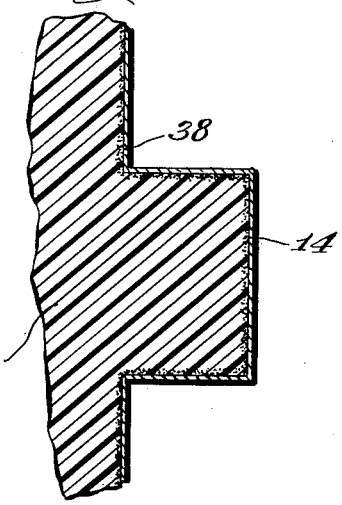
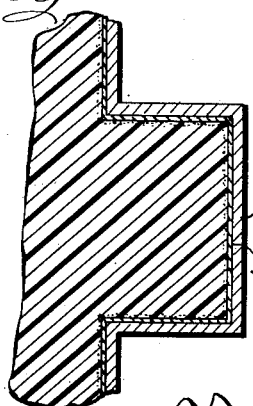
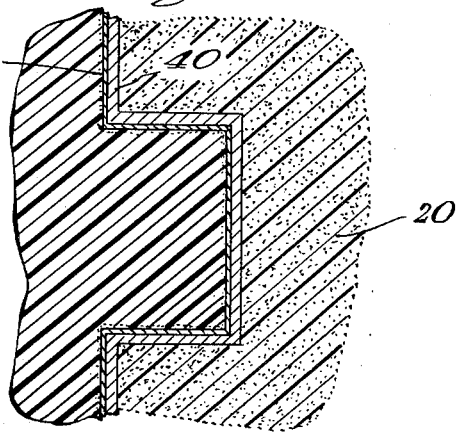
Inventor
Axel Lundbye
By Mann, Brown & Hausmann
Attorneys

# United States Patent Office 2,768,133
Patented Oct. 23, 1956

2,768,133

PLASTIC ARTICLES AND METHOD OF MAKING SAME

Axel Lundbye, Mount Morris, Ill.

Application August 4, 1951, Serial No. 240,400

7 Claims. (Cl. 204—20)

My invention relates to plastic articles and method of making same and is concerned with articles made both of thermosetting and thermoplastic materials.

In my copending applications Serial No. 240,396, filed August 4, 1951, and now abandoned, and Serial No. 240,397, filed August 4, 1951, and now abandoned, and Serial No. 240,399, filed August 4, 1951, and now abandoned, I have described and claimed printing plates made of thermosetting plastic. Such plates give excellent results and I have utilized such plates to make 750,000 or more impressions without destroying the utility of the plate. I have found, however, that the number of impressions which can be made from thermosetting plastic printing plates can be greatly increased if the printing faces of such plates are provided with a coating of chromium, and the principal object of my present invention is to provide a chromium-plated printing plate and method of producing same.

While my novel method is useful in applying chromium plating to a printing plate, it is capable of electroplating metal coatings of various kinds on a wide variety of plastic articles, and another principal object of my invention is to provide a new and improved method of electroplating a metal coating on a plastic article.

Another object of my invention is to provide a new and improved method of separating a plastic printing plate from a plastic matrix.

Other objects and advantages will become apparent as the description proceeds.

In the drawings:

Fig. 1 is a partial sectional view of a plastic matrix and plastic printing plate engaging the matrix;

Fig. 2 is an enlarged view of the engaging faces of the matrix and printing plate;

Fig. 3 is an enlarged view of a portion of the matrix face showing a layer of graphite or similar separating material applied thereto;

Fig. 4 is a view similar to Fig. 3 but showing the matrix face after the addition of a layer of silver;

Fig. 5 is an enlarged view similar to Figs. 3 and 4 but showing the addition of the powdered plastic which is to be cured to form the face of the printing plate;

Fig. 6 is a view of a portion of the completed printing plate with the chrome plating thereon; and Fig. 7 is a view showing a portion of a plastic figurine embodying my invention.

Referring to Fig. 1 it will be seen that I have illustrated therein a matrix indicated generally by reference character 10 and a printing plate indicated generally by reference character 12, the matrix having a reproducing surface 14 and the printing plate a reproducing or printing surface or face 16. The reproducing faces are provided by thermosetting plastic layers 18 and 20 respectively which may or may not include a small percentage of rubber in suspension as described and claimed in one of my aforesaid applications. In addition to the plastic layer 18, the matrix has layers 22 and 24, each consisting of a plurality of sheets of paper or like material impregnated with plastic, a center layer 26 preferably consisting of one or more mats of glass or other inorganic fiber, and a rear layer 28 of thermosetting plastic.

The particular printing plate shown has in rear of the face layer 20 a layer 30 comprising a plurality of sheets of paper or like material impregnated with thermosetting plastic, a thermosetting plastic layer 32, a second layer 34 consisting of sheets of impregnated paper or like material, and a rear plastic layer 36 which may or may not contain a small quantity of rubber in suspension.

It is to be understood that the particular type of thermosetting plastic used in the matrix and printing plate or any of the layers thereof forms no part of my present invention and that the matrix and printing plate may each consist of only a single layer or a plurality of layers as desired and that the particular plates shown are for illustration only.

In carrying out my novel method, the plastic reproducing face of the matrix is preferably first blasted with a very fine powder which may vary from 1250 mesh down to 25 mesh, depending upon the result desired, although I have found that 325 mesh is best suited for blasting most matrices. The powder which I prefer is known as "microbrasive" and is Arkansas oil stone in powder form, although other types of powder may be used. This blasting step appears to give the face of the matrix a smoother surface, but actually it produces a surface completely covered with minute intagliations. These intagliations or indentations of microscopic size increase the effective area of the face of the matrix and the corresponding face of the silver layer sprayed thereon as hereinafter explained. While desirable, this step may be omitted as it is not essential.

The face of the matrix is then coated with a layer of separating material such as graphite, stearates, or silicone. In Fig. 3 I have shown a thin layer 38 of graphite covering the face 14 of the thermosetting layer 18. This graphite may be applied as a colloidal solution of graphite and water, and the application of this solution may be effected by washing, painting, or spraying. After the solution is dried, the surface of the matrix is preferably brushed with a dry brush or subjected to a jet of air in order to remove excess graphite. The film of graphite, sterates, or silicone remaining on the matrix is in the order of 1 to 20 micro inches thick and does not cover up the intagliations produced by the blasting step.

The next step in my process is to spray a solution of silver nitrate and a reducer onto the graphite layer 38. This forms a thin layer or coating 40 of silver shown in Fig. 4. Where the matrix was blasted with powder, the face of this silver layer next to the matrix conforms to the microscopic indentations thereof and thus has a substantially greater surface area. The matrix is now in condition to receive the material of which the printing plate is to be composed and in Fig. 5 I have illustrated the thermosetting plastic material which makes up the face layer 20 as being applied in the form of a plastic powder.

The successive layers of the printing plate are built up on the matrix and then cured by heat and pressure in the manner described in my aforesaid copending applications, or in any other suitable manner. During the curing operation the metal of the silver coating 40 penetrates the thermoplastic powder and adheres to the printing face of the plastic layer produced by this powder. The result is a silver coating which is bonded to this plastic layer and which is inseparable therefrom. In Fig. 2, I have shown the plastic layer 20 of the printing plate as having this silver coating 42. This silvered reproducing face of the printing plate accurately corresponds to the face of the matrix and to all intents and purposes becomes an integral part of the thermosetting layer 20 of the printing plate.

By virtue of the presence of the graphite layer 38 and the silvered surface 42 of the printing plate, it is easy to separate the printing plate from the matrix. In fact, the silvered surface of the printing plate is of such great assistance in separating this plate from the matrix that in some instances I spray the matrix with the silver solution and reducer solely for the purpose of providing ease of separation between the printing plate and the matrix. While I usually use the graphite coating in addition to the silver spray, I can spray the silver solution and reducer directly on the matrix without first applying a coating of graphite. In each instance the silver layer will be transferred to and become an integral part of the printing plate during the curing thereof and will readily disassociate itself from the surface of the matrix.

Where the silver layer is used solely as a separating medium, it can be left on the printing plate and will not modify in any way the printing characteristics of such plate. It does, however, discolor the plate since the silver oxidizes unevenly over the face of the plate to create a discolored and unattractive surface which can be removed by the application of nitric acid to the surface of the printing plate. This acid does not affect the thermosetting plastic or modify its printing characteristics in any way.

The primary purpose, however, of spraying the silver layer on the matrix and having it transferred to and incorporated in the printing plate as hereinabove described, is to permit plating of the printing plate with a layer of chrome or other metal. While chromium may be plated directly over the silvered surface of the printing plate, I have found that it is preferable to first apply a coating of acid copper, cyanide copper, or nickel, before applying the chromium. In Fig. 6, I have shown on an enlarged scale a part of a face of a printing plate 44 having a silver coating 46, a copper coating 48, a nickel coating 49, and a chromium coating 50.

Ordinarily a very thin coating of silver is sufficient, but, if desired, a heavier coating can be obtained by spraying the matrix several times with the silver nitrate and reducer. The copper, nickel, chromium, and other metal coatings can be made of any desired thickness in a conventional electrolytic bath. Where the matrix was blasted with powder, the exposed surface of the silver layer has exceedingly small projections corresponding to the intagliations of the matrix. These projections materially increase the surface area of the silver layer and provide a stronger bond between this layer and any layer or layers applied thereto. This is particularly advantageous where it is desired to apply a heavy coating to the silver layer.

In preparing a thermosetting plastic matrix from a type form, the form is placed on a copper sheet which has preferably been coated with a solution of graphite in water and polished so that the copper sheet is absolutely free from grit of any kind on both sides. A layer of thermoplastic powder is then distributed as evenly as possible on the form, the thickness of the powder being such that the weight of the powder is .05 ounce per square-inch. The powder may be phenol formaldehyde. A sheet of long fiber paper impregnated with a thermosetting resin such as phenol formaldehyde and dried without curing is placed on top of the powder.

A second layer of powder is evenly distributed on the sheet so that one square-inch of powder weighs .01 ounce. A suitable powder is composed of a mixture of finely divided particles of synthetic rubber and phenol formaldehyde resin. This powder as well as the other powders used may or may not contain some wood flour which is frequently incorporated in such powders to reduce the cost and increase strength. A fiber glass mat of the kind described in my aforesaid application, Serial No. 240,396, is placed over this second layer of powder. A second layer of the last-mentioned powder is placed upon the fiber glass sheet and evenly distributed so that one square-inch of powder weighs .01 ounce. A second impregnated paper sheet is placed upon the last-named layer of powder.

A third layer of the synthetic rubber and phenolic powder is evenly distributed on the last-named sheet in such manner that one square-inch of powder weighs .05 ounce. A second copper sheet also coated with a graphite and water solution and polished is then placed on the last layer of powder and the entire unit placed on the apron of a press as near the center as possible. With the upper and lower platens at 300° F. the apron is slid into the press. The press is then closed and a pressure of 125 pounds per square-inch applied. At the end of sixty seconds the pressure is released momentarily and then reapplied for a further period of five minutes to complete the cure of the matrix.

The entire unit is then removed from the press and the matrix immediately separated from the type form. This may be accomplished easily by loosening the edge with a steel putty knife and then lifting up one end of the matrix, and this should be done before the matrix has had time to cool. After separation, the matrix is further cooled, as for example by putting in a cool pants presser for a period of two minutes. The matrix is then cleaned.

The matrix is subjected to a blast of 325-mesh Arkansas oilstone powder mixed with air. The face of the matrix is then painted with a silicone having a viscosity like that of light oil, and the face of the matrix permitted to dry. The face of the matrix is then subjected to a jet of air to remove excess silicone.

The next step is to spray a solution of silver nitrate and reducer onto the face of the matrix. The matrix is then dried thoroughly and placed face up on a copper sheet which has previously been coated with a graphite and water solution and polished, care being taken to see that the copper sheet is entirely free from any foreign particles on either side. The material for the plastic plate is then placed directly on the matrix face and is composed of the following—phenol formaldehyde powder of such thickness that one square-inch weighs .05 ounce; two impregnated paper sheets; a layer of synthetic rubber and phenolic powder having a weight of .05 ounce per square-inch; two impregnated paper sheets; a second layer of rubber and phenolic powder having a weight of .05 ounce per square-inch. The layers of powder should be evenly distributed.

A second copper sheet which has been cleaned, coated with a colloidal suspension of deflocculated graphite in water, such as "Aquadag," and polished, is placed on top of the uppermost powder layer and the entire unit placed in the middle of the press apron. Again, with the platens at 300° F. each, the apron is slid into the press and 500 pounds per square-inch immediately applied. At the end of one minute the pressure is momentarily released and then reapplied for an additional four minutes. The entire unit is next removed from the press and placed in a water-cooled pants presser and cooled for two minutes, or until cool enough to handle. After cooling and removing the copper plates, the matrix and printing plate formed thereon are placed on a table and sawed to size with a saw preferably equipped with carboloy tipped blades. The printing plate is then separated from the matrix by loosening all around with a stiff putty knife.

The printing plate will have a silvered printing face which is an integral part of the plate. The plate is then placed in a conventional electroplating bath and layers of copper, nickel and chrome-deposited thereon by usual procedures.

Where the plate is for a press having a flat bed, the back of the plate is shaved to proper thickness with a shaver equipped with carboloy tipped blades to give a plate approximately .190 inch thick. The back of the plate is then coated with a thermosetting adhesive such as "Pliobond" and the wood corner block is also coated with the same adhesive. Both the plate and block are allowed to dry and a second coat applied to each. When the adhesive becomes tacky the plate is placed on the block and the assembly immediately inserted in a hot pants presser at 275° F. and held there for four minutes. The plate is then removed from the hot presser, a rubber blanket placed over the plate, and this assembly put immediately into a cold molding press and 100 pounds per square-inch applied for four minutes. Upon removal from this press the plate is ready for rectifying, final makeready, and then printing.

As previously pointed out, a plastic printing plate coated with chromium is capable of producing many more impressions than is a printing plate without this coating. In the foregoing description I have described a plastic printing plate as being made from a plastic matrix onto which the silver nitrate is sprayed. In some instances it is desirable to make a plastic printing plate from a matrix of metal. When this is done the plastic printing face of the printing plate is formed from an uncured or partly cured plastic sheet onto which the silver nitrate solution and reducer are sprayed. When the printing plate is molded and cured by bringing the sprayed sheet and the metal matrix together under heat and pressure, the silver penetrates the surface of the printing plate and becomes an integral part of the matrix layer, so that it is inseparable therefrom by mechanical means but can be eaten away by an acid such as nitric acid.

In some instances it is not necessary or desirable to metal plate the entire surface of the printing plate and in such circumstances the parts of the printing plate which are not to be coated are covered with a mask and only the unmasked portions of the matrix are sprayed with the silver solution and reducer. This same practice can be applied in the metal coating of other plastic articles and is not limited to the preparation of plates for the graphic arts.

In Fig. 7, I have shown a part of a figurine 60 having one or more layers 62 of metal plating. In the printing plate the purpose of the metal plate is to prolong the life of the plate, whereas in an article such as a figurine the purpose would be to enhance the appearance of the article. My novel method of metal plating a plastic may be applied to numerous other articles and may serve many and varied purposes. It is not limited to plastic articles made of thermosetting material but may be applied to articles made of thermoplastic material.

It is to be understood that my invention is not limited to the particular details shown and described but includes all variations, substitutions, modifications, and equivalents coming within the scope of the appended claims.

I claim:

1. A method of forming an electrolytic coating on a plastic article which comprises forming a mold of cured synthetic resin plastic having a reproducing face defined by depressions therein, applying a continuous and integral sheet-like layer of silver upon the reproducing face of the mold to conform to and take on the impressed pattern in the reproducing face, placing a mass of uncured synthetic resin plastic material upon the mold with the silver layer sandwiched therebetween, applying heat and pressure to the mold and mass of material to simultaneously cure the material and create an integral bond between the silver layer and the plastic material, stripping the cured plastic material together with the silver layer bonded thereto from the mold to expose the patterned face of the silver layer, and electroplating the patterned face of the silver layer.

2. A method of forming an electrolytic coating on a plastic article which comprises forming a mold of cured synthetic resin plastic having a reproducing face defined by depressions therein, forming microscopic indentations throughout the reproducing face of the mold, applying a continuous and integral sheet-like layer of silver upon the reproducing face of the mold to conform to and take on the impressed pattern in the reproducing face, placing a mass of uncured synthetic resin plastic material upon the mold with the silver layer sandwiched therebetween, applying heat and pressure to the mold and mass of material to simultaneously cure the material and create an integral bond between the silver layer and the plastic material, stripping the cured plastic material together with the silver layer bonded thereto from the mold to expose the patterned face of the silver layer, and electroplating the patterned face of the silver layer.

3. A method of forming an electrolytic coating on a plastic article which comprises forming a mold of cured synthetic resin plastic having a reproducing face defined by depressions therein, forming microscopic indentations throughout the reproducing face of the mold, applying a coating of separating material to the reproducing face of the mold, applying a continuous and integral sheet-like layer of silver upon the coating of separating material to conform to and take on the impressed pattern in the reproducing face, placing a mass of uncured synthetic resin plastic material upon the mold with the silver layer sandwiched therebetween, applying heat and pressure to the mold and mass of material to simultaneously cure the material and create an integral bond between the silver layer and the plastic material, stripping the cured plastic material together with the silver layer bonded thereto from the mold to expose the patterned face of the silver layer, and electroplating the patterned face of the silver layer.

4. A method of forming an electrolytic coating on a plastic article which comprises forming a mold of cured synthetic resin plastic having a reproducing face defined by depressions therein, applying a coating of separating material to the reproducing face of the mold, applying a continuous and integral sheet-like layer of silver upon the coating of separating material to conform to and take on the impressed pattern in the reproducing face, placing a mass of uncured synthetic resin plastic material upon the mold with the silver layer sandwiched therebetween, applying heat and pressure to the mold and mass of material to simultaneously cure the material and create an integral bond between the silver layer and the plastic material, stripping the cured plastic material together with the silver layer bonded thereto from the mold to expose the patterned face of the silver layer, and electroplating the patterned face of the silver layer.

5. The method as defined in and by claim 1 wherein the last step includes electrolytically applying layers of copper and chromium respectively upon the layer of silver.

6. The method as defined in and by claim 1 wherein the last step includes electrolytically applying a layer of chromium upon the layer of silver.

7. A method of forming an electrolytic coating on a plastic article which comprises forming a mold of cured synthetic resin plastic having a reproducing face defined by depressions therein, spraying a solution of a silver salt and a reducing agent upon the reproducing face of the mold to apply a continuous and integral sheet-like layer of silver upon the reproducing face to conform to and take on the impressed pattern in the reproducing face, placing a mass of uncured synthetic resin plastic material upon the mold with the silver layer sandwiched therebetween, applying heat and pressure to the mold and mass of material to simultaneously cure the material and create an integral bond between the silver layer and the plastic material, stripping the cured plastic material together with the silver layer bonded thereto from the mold to expose the patterned face of the silver layer, and electroplating the patterned face of the silver layer.

References Cited in the file of this patent

UNITED STATES PATENTS

| Number | Name | Date |
|---|---|---|
| 672,451 | Moore | Apr. 23, 1901 |
| 1,377,504 | Novotny | May 10, 1921 |
| 1,379,433 | Yeoell | May 24, 1921 |
| 1,681,447 | Torrison | Aug. 21, 1928 |
| 1,759,099 | Dake | May 20, 1930 |
| 2,025,528 | Schreiber | Dec. 24, 1935 |
| 2,128,550 | Ford | Aug. 30, 1938 |
| 2,264,003 | Osenberg | Nov. 25, 1941 |
| 2,357,950 | Goessling | Sept. 12, 1944 |
| 2,424,583 | Rahm | July 29, 1947 |
| 2,439,137 | Keller | Apr. 6, 1948 |
| 2,439,489 | Rosenthal | Apr. 13, 1948 |
| 2,478,165 | Collins | Aug. 2, 1949 |
| 2,548,765 | Banks | Apr. 10, 1951 |

FOREIGN PATENTS

| Number | Country | Date |
|---|---|---|
| 363,432 | Great Britain | Dec. 24, 1931 |

OTHER REFERENCES

Marcus: Trans. Electrochem. Soc., vol. 88, pp. 371–386, 1945.